(12) United States Patent
Sevcik

(10) Patent No.: US 6,266,699 B1
(45) Date of Patent: *Jul. 24, 2001

(54) CONTROL IN AN INTELLIGENT NETWORK

(75) Inventor: Maximilian Sevcik, Munich (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 27 days.

(21) Appl. No.: 08/837,366

(22) Filed: Apr. 17, 1997

(30) Foreign Application Priority Data

Apr. 17, 1996 (EP) .................................. 96106088

(51) Int. Cl.[7] ............................................. G06F 15/16
(52) U.S. Cl. .................. 709/229; 709/238; 709/239; 709/241; 709/244
(58) Field of Search ................ 395/200.71, 200.69, 395/200.68, 200.72, 200.74, 200.59; 709/241, 239, 238, 242, 244, 229

(56) References Cited

U.S. PATENT DOCUMENTS

| | | | |
|---|---|---|---|
| 5,327,486 | 7/1994 | Wolff et al. ............................ 379/96 |
| 5,410,543 | * 4/1995 | Seitz et al. ........................ 370/85.13 |
| 5,598,536 | * 1/1997 | Slaughter, III et al. ........ 395/200.16 |
| 5,684,951 | * 11/1997 | Goldman et al. ............... 395/188.01 |
| 5,706,286 | * 1/1998 | Reiman et al. ...................... 370/401 |
| 5,724,355 | * 3/1998 | Bruno et al. ......................... 370/401 |
| 5,732,137 | * 3/1998 | Aziz ...................................... 380/25 |
| 5,737,414 | * 4/1998 | Walker et al. ........................... 380/4 |
| 5,745,556 | * 4/1998 | Ronen ................................ 379/127 |
| 5,751,961 | * 5/1998 | Smyk ................................. 709/217 |
| 5,761,290 | * 6/1998 | Farris et al. ........................ 379/207 |
| 5,781,632 | * 7/1998 | Odom .................................. 380/24 |
| 5,793,762 | * 8/1998 | Penners et al. ..................... 370/389 |
| 5,826,014 | * 10/1998 | Coley et al. ..................... 395/187.01 |
| 5,826,270 | * 10/1998 | Rutkowski et al. .................. 707/10 |
| 5,862,325 | * 1/1999 | Reed et al. ..................... 395/200.31 |
| 5,915,008 | * 6/1999 | Dulman ............................. 379/201 |

OTHER PUBLICATIONS

A. Reinhardt, "The Network with Smarts", BYTE, Oct. 1994, pp. 51–52, 56, 58, 60, 62 and 64.

Tao et al., "Internet Access via Baseband and Broadband ISDN Gateways", IEEE 13th Annual International Phoenix Conference on Computer and Communications, Apr. 12–15, 1994, pp. 485–490.

Luotonen et al., Computer Networks and ISDN Systems 27 (1994), Nov. 1994, pp. 147–154.

* cited by examiner

Primary Examiner—Saleh Najjar
(74) Attorney, Agent, or Firm—Schiff Hardin & Waite

(57) ABSTRACT

A control is provided for the increasing number of Internet users who use networks to access Internet services. The control includes a service control point function as well as a domain name server function so that it is possible to request an Internet service and to select an optimum route to a server that contains the requested Internet service by the present control.

11 Claims, 2 Drawing Sheets

CONTROL IN AN INTELLIGENT NETWORK

BACKGROUND OF THE INVENTION

1. Field of the Invention

The present invention relates generally to a control for an intelligent network and, in particular, to call handling in a telecommunications network.

2. Description of the Related Art

The technology of intelligent networks (abbreviated herein as IN) is a known technology which has introduced into many networks for controlling call handling in a telecommunications network. Such telecommunication networks may include narrow band networks such as PSTN/ISDN (Public Switched Telephone Network/Integrated Services Digital Network) or broadband networks such as BB-ISDN/ATM (Broadband Integrated Services Digital Network/Asynchronous Transfer Mode). In a telecommunications network, a service control point SCP assumes the control of the following functions at every intelligent network call, for example:

determining the destination route and the destination call number depending on the source, the time of day, the call distribution at the processing locations, etc.;

determining the billing and charging;

controlling the network access for authorized users, including use of billing cards and virtual private networks VPN.

An increasing number of Internet users use PSTN/ISDN (Public Switched Telephone Network/Integrated Services Digital Network) networks and, later, ATM (Asynchronous Transfer Mode) networks as access networks to Internet services, in other words to access applications on the servers of the Internet service providers.

A known arrangement for Internet access is shown in FIG. 1 which uses for example a narrowband network, such as a narrowband ISDN (which is abbreviated here as NB-ISDN). In the Internet access arrangement as shown in FIG. 1, the network has the following disadvantages:

1) The connections in the narrowband network NB-ISDN and the intelligent network IN functions in the service control point SCP are transparent for Internet applications. The narrowband network NB-ISDN only offers access via bearer channels to the actual router for known Internet protocols IP or to a server directly at the network, as shown in, for example, at a server A2. This also applies for broadband ATM networks by analogy. The routing of connections cannot be optimized for the Internet access. When, for example, access to the server A2 is desired, but the connection is set up to the router A1, the Internet Protocol IP packets are transferred over the potentially slow Local Area Networks/Wide Area Network LAN/WAN. A direct ISDN connection to the server A2 would be desirable.

2) The billing in the narrowband access network NB-ISDN is decoupled from the Internet. Combined billing is not possible.

3) Extensive security measures must be provided in the Internet servers since the access to the Internet services via the public narrowband network NB-ISDN is open to everyone.

4) Internet domain addresses indicate the individual Internet applications on the Internet. The domain addresses must be converted into corresponding Internet protocol IP addresses according to the Internet norm (and vice versa). The know conversion method in the Internet is realized by use of a domain name server DNS. The address conversion in the domain name server DNS is initiated by the Internet Protocol IP routers and servers.

SUMMARY OF THE INVENTION

An object of the present invention is to overcome the foregoing disadvantages of known networks.

This and other objects and advantages are achieved by the present invention by a control means in an intelligent network which contains a service control point component that controls the request for an intelligent network service on a network-central level, and a control means which contains a domain name server component that supports the service control point component in determining the optimum route to a server that contains the requested Internet service when the Internet service is requested.

The structure for an intelligent network IN for Internet applications allows an exchange of the control information between the service control point function and the domain name server function in that both of these functions are now united in the same structure which is referred to here as an Internet service node. As a result, determining the optimum route to a server that contains the requested Internet service is enabled when a request is received for an Internet service via the intelligent network.

Auxiliary functions are enabled by expanding the domain name server DNS function and the service control point SCP function with auxiliary information. For example, an embodiment is provided wherein the domain name server function contains particular information about the Internet applications in the respective servers that the control means can deliver to the user via the ISDN bearer channel. This shortens the interaction time and simplifies the manipulation of Internet applications.

In a further embodiment, the authorizations of a specific user with respect to specific servers or to Internet applications are stored in the service control point SCP function. The authorization requirements of users with respect to specific servers or with respect to Internet applications are stored in the domain name server DNS function. The service control point function implements the authorization check of a user by interrogating the authorization requirements for access to servers or to the Internet application requested by a user from the domain name server DNS function and comparing these requirements to the authorizations of the user. As a result, the security of the Internet applications is decidedly improved since a narrowband network NB-ISDN or broadband network BB-ISDN is considered secure or that the control device node is operated by reliable operators.

In an another embodiment, the billing unit for access onto a specific server or onto a specific Internet application is stored in the service control point SCP function. In this embodiment, the service control point SCP function, based on the knowledge of the servers and applications selected by the accesses onto the domain name server DNS function, can determine the billing according to previously determined, flexibly variable fee schedules and can display the billing to the users by a billing method which is known in telecommunications networks (for example, by advising of charges and tickets). The handling of the billing of Internet use can thereby be expanded, in particular by the methods which are known from intelligent networks IN such as the use of: calling cards, pre-paid cards, or by the use being billed via commercial credit cards.

User groups for whom access to specific servers or to specific Internet applications is exclusively reserved are stored in the service control point function, according to one embodiment. The service control point SCP function checks the access of a user to the specific servers or specific Internet applications on the basis of this stored user groups. As a result of this improvement, the service control point SCP function can reserve the access to specific Internet servers and applications to a specific user group, in particular according to the known principles of virtual private networks VPN. The service control point function in the Internet service node ISN recognizes the members of the user group and checks their authorization to access of specific servers or applications by asking in the domain name server DNS function. In combination with the billing explained above, this embodiment offers an individual design of the billing, for example, billing individually for each virtual private network VPN user group.

For mobile users, the service control point SCP function stores the routing information for the most recently used applications until the conclusion of the use. The continuation of the interaction at the new location is thereby facilitated, for example, by automatic setup of a connection. The fees for the use of the network and of the Internet applications is determined relative to the location on the basis of the information stored in the domain name server DNS function.

From the viewpoint of other Internet servers, the control means of the present invention represents an Internet server and, thus, can exchange data with other Internet servers. This makes it possible that specific Internet applications in specific servers can modify the data in the control means of the present invention. In particular, it is possible to modify the routing data in the service control point function, to modify the addresses and particular information about Internet applications in the domain name server DNS function, and to modify the authorizations, the personal identification numbers PIN, and the billing information in the service control point and in the domain name server functions.

DETAILED DESCRIPTION OF THE PREFERRED EMBODIMENT

Figure 1:
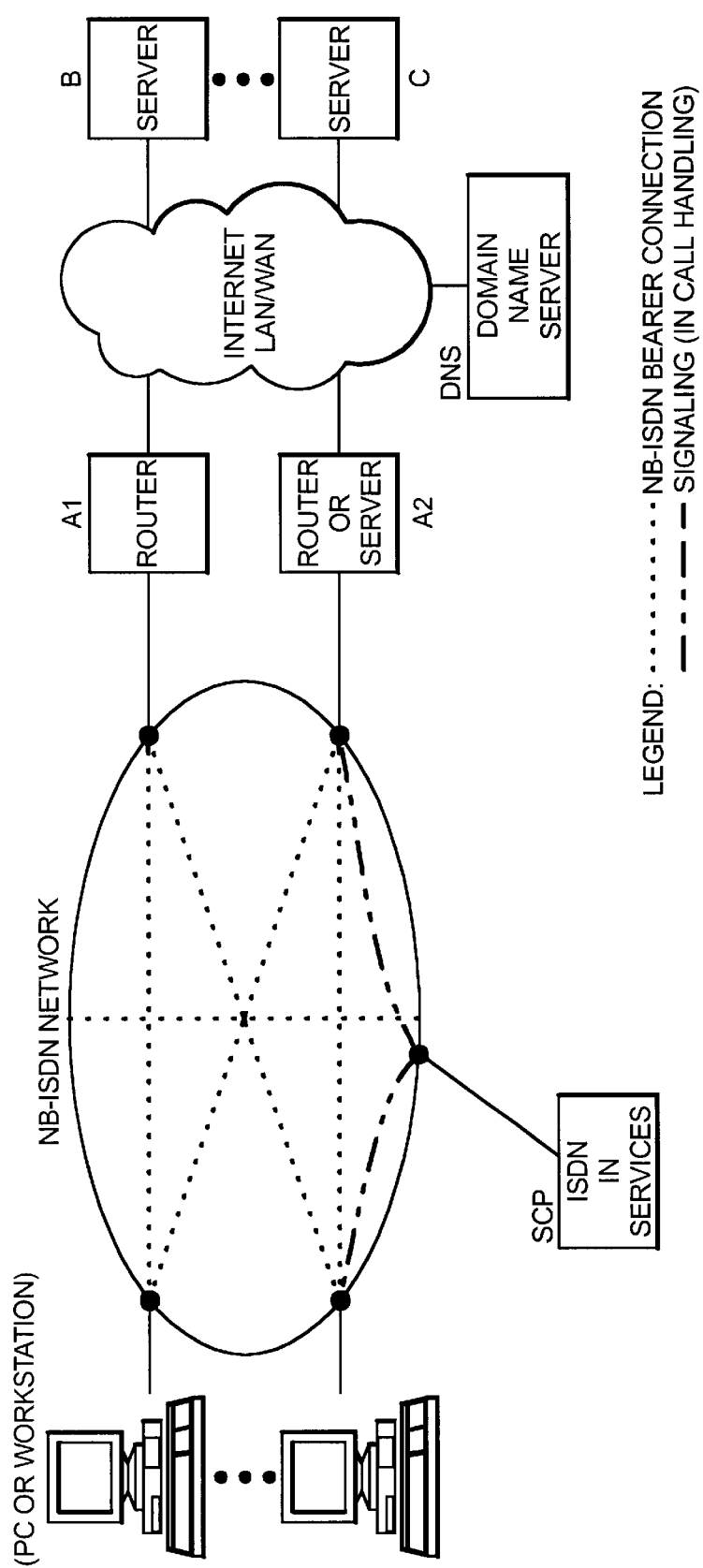
FIG. 1 is a schematic diagram of a known network for Internet access.
Figure 2:
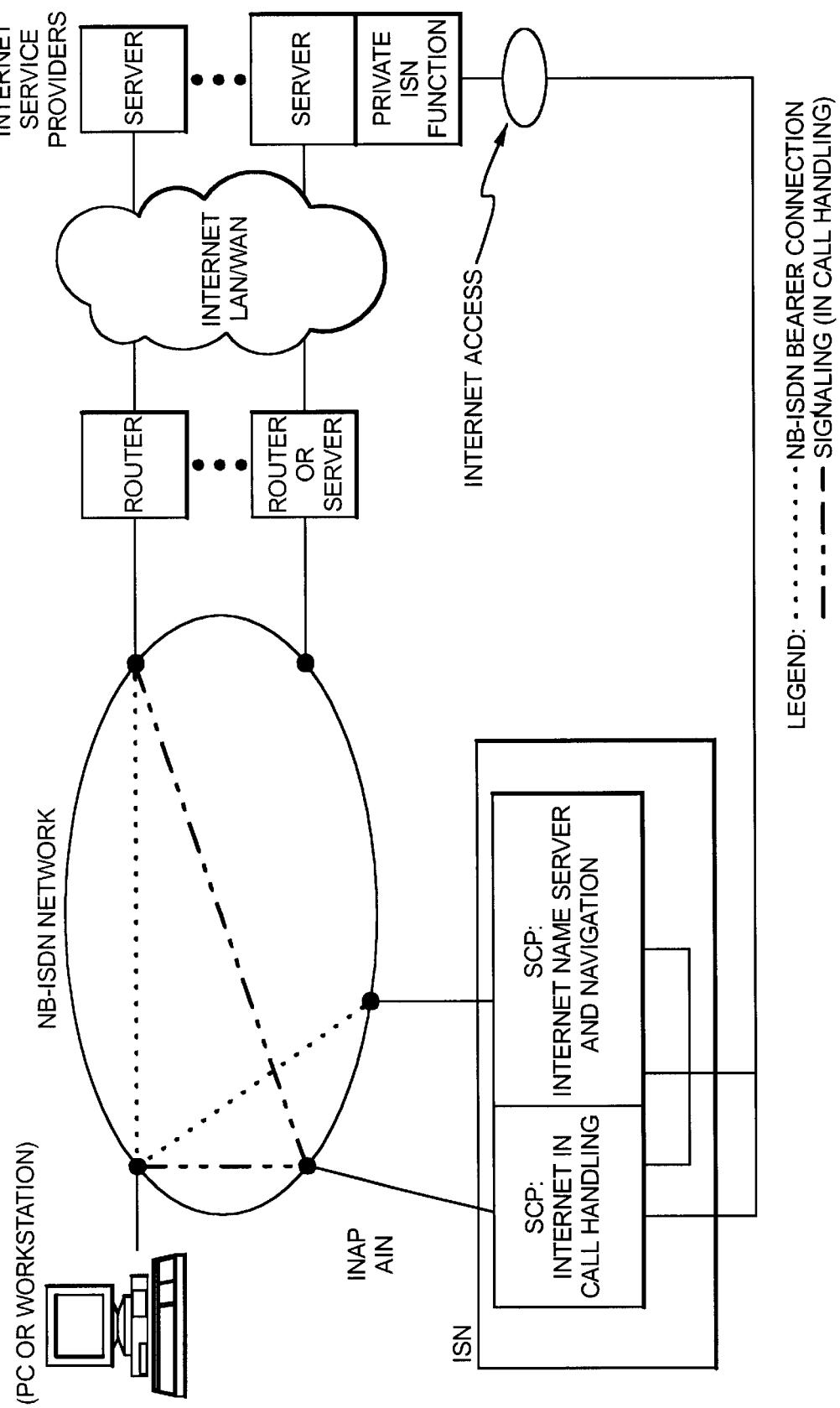
FIG. 2 is a schematic diagram of a network for Internet access including the control means according to the principles of the present invention.

Referring to FIG. 2, a structure for Internet access with reference to an example of a narrowband network, which here is shown as a narrowband ISDN or NB-ISDN. An analogous structure is usable for future broadband ISDN services, such as ATM services. The domain name server DNS function then corresponds to the intelligent network IN standard function of special resource function SRF. The following examples 1–6 are used to explain the invention in more detail.

EXAMPLE 1

At every call that serves to access one or more Internet applications, the service control point function in an Internet service node ISN which contains both the service control point SCP function as well as the domain name server DNS function is selected through known intelligent network IN protocols INAP or AIN at the incoming or outgoing sides of the respective narrowband network NB-ISDN switching systems. To distinguish the Internet related calls, selection of a service code, for example 1333, and identity of the caller, for example the calling line identity, etc. is utilized. By interrogating the domain name server DNS function in the same Internet service node ISN, the particular information for optimum routing, such as a lower cost connection, of the call to the appertaining Internet router/server, such as the address E.164 address are than determined by the service control point SCP function from the address of the requested Internet application. For example, the Internet protocol IP address or other data from the user-to-service signal information according to ISDN standards. These are simultaneously supplied via signaling. Using known methods, the particular information initiates the service control point SCP function to instruct the corresponding switching center, such as a service switching point SSP, that this carries out a corresponding connection setup on the basis of the E.164 address.

EXAMPLE 2

In addition to the address conversion provided in the Internet, the domain name server DNS function can also contain particular information about Internet applications in the respective servers, such as navigation information, on-line help, etc. In the handling of the call, the service control point SCP function can provide that this information has been delivered from the domain name server DNS to the user via the ISDN bearer channel or that the user interactively seeks the desired application. When the application has been found, the domain name server DNS function automatically initiates the setup of an ISDN connection to this application, or to a router at the same network then enables an optimum access to this application. The optimum routing in the network is explained above. As a result, the interaction time is shortened and the manipulation of Internet applications is simplified. The execution sequence can be repeated at every new selection of an application or of an Internet protocol IP address.

EXAMPLE 3

Based on the knowledge of the calling user and the user's authorizations which are stored in the service control point SCP function, a determination as to whether the corresponding user is authorized to access specific servers or their applications can be made by interrogating the authorization requirements which are stored in the domain name server DNS function. These include, for example, the requirements for access to specific servers or their application. The authorization check can be arbitrarily intensified using such known means as a personal identification number PIN. The call handling is aborted when unauthorized users attempt access. Since a narrowband network NB-ISDN or a broadband network BB-ISDN is considered secure or, the Internet service node ISN is operated by trustworthy operators, the security of the Internet applications is decidedly improved.

EXAMPLE 4

Based on the knowledge of the servers and applications which are selected by the accesses to the domain name server DNS function, the service control point SCP function can determine the billing according to the previously defined, flexibly variable fee schedules and can display this to the users with a billing method such is that known in telecommunication networks, such as by advising of charges and tickets. The handling of the billing of Internet use can be expanded by the use of such known intelligent network IN methods as: calling cards, pre-paid cards and by the use of the network being billed through commercial credit cards.

EXAMPLE 5

The access to specific Internet servers and applications can be reserved for a specific user group according to the principles applied in the operation of a virtual private network VPN. The service control point SCP function in the Internet service node ISN recognizes the members of the group according to the method disclosed above in Example 1 and checks their authorization to access specific servers or applications in the domain name server DNS function. This function can also be combined with the billing as explained above in Example 4, wherein the billing is individually designed for each virtual private network VPN user group.

EXAMPLE 6

The users can be mobile, in other words the users can sign on and sign off at arbitrary points in the network. To this end, the user authorization is verified according to the methods disclosed above in Example 3, such as for example a personal identification number PIN check. The service control point SCP function can retain the necessary information about the most recently employed application between the changes in location. As a result, the continuation of the interaction at a new location is facilitated, for example, by automatic setup of a connection that assures an optimum access to this application from the new location. The charges for the use of the network and of the Internet applications are determined according to the location on the basis of the information stored in the domain name server DNS function.

EXAMPLE 7

A number of Internet service nodes ISN can be present in every telecommunication network. Each Internet service node ISN is itself an Internet server and can exchange data with other Internet servers, for example, by data file transfers. As a result, the specific applications in specific servers can modify the data in the Internet server node ISN. In particular, the modification of the routing data in the service control point SCP function, the modification of the addresses and the particular information about Internet applications in the domain name server DNS function, the modification of authorizations, personal identification numbers PIN, billing information in the service control point SCP and the domain name server DNS function can be modified.

To this end, specific servers can have a private Internet service node ISN function available to them that controls these modifications depending upon the application.

Thus, there is shown and described a control means for service control point functions as well as domain name server functions wherein it is possible with a request for Internet service to select an optimum route to a server that contains the requested Internet service.

Although other modifications and changes may be suggested by those skilled in the art, it is the intention of the inventor to embody within the patent warranted hereon all changes and modifications as reasonably and properly come within the scope of his contribution to the art.

I claim:

1. A control means for an intelligent network, comprising:
   a service control point component which controls a request for an intelligent network service on a network-central level, said service control point being constructed to distinguish between a request for an Internet service and a request for other services; and
   a domain name server component connected in communication with the service control point component, given a request for an Internet service as determined by said service control point said domain name server being constructed to determine an optimum route from among a plurality of routes to a server that contains the requested Internet service, said domain name server component being constructed to communicate said optimum route to said service control point component, said service control point component routing said request on said optimum route.

2. A control means as claimed in claim 1, wherein the domain name server component provides particular information about Internet applications in the respective servers, the particular information being delivered to the user through an ISDN bearer channel.

3. A control means for an intelligent network comprising:
   a service control point component which controls a request for an intelligent network service on a network-central level; and
   a domain name server component that supports the service control point component given a request for an Internet service in determining the optimum route to a server that contains the requested Internet service,
   wherein the service control point component stores authorizations of the specific user with respect to specific servers or to Internet applications;
   the domain name server component stores the authorization requirements of the user with respect to specific servers or Internet applications;
   the service control point component implements an authorization check of a user by interrogating the authorization requirements for access to servers or to Internet applications requested by a user from the domain name server component and comparing these requirements to the authorizations of the user.

4. A control means as claimed in claim 1, wherein said service control point component includes a billing unit for access onto a specific server or onto a specific Internet application.

5. A control means as claimed in claim 1, wherein said service control point component stores user groups for whom access to specific servers or specific Internet applications is exclusively reserved;
   said service control point component checks the access of a user to the specific servers or specific Internet applications on the basis of the stored user groups.

6. A control means as claimed in claim 1, wherein said service control point component stores routing information for mobile users for a most recently used application until a conclusion of use.

7. A control means as claimed in claim 1, wherein said control means is identified as an Internet server by other Internet servers and is capable of exchanging data with other Internet servers.

8. A method for controlling access to Internet services via an intelligent network, comprising the steps of:
   signaling a control means of an intelligent network from an intelligent network Service Control Point by selecting a corresponding service code that a connection to an Internet service is requested as distinguished from a request for another service;
   determining an optimum route from among a plurality of routes to a server that contains the requested Internet service by the control means with the assistance of a domain name server, said optimum route being communicated said control means and said domain name server; and
   initiating a connection that is setup to the server via said optimum route.

9. A control means as claimed in claim 1, further comprising: identification means for identifying a request for internet service.

10. A control means as claimed in claim 9, wherein said identification means is a service code.

11. A control means for an intelligent network, comprising:
- a service control point component which controls a request for an intelligent network service on a network-central level; and
- a domain name server component connected in communication with the service control point component given a request for an Internet service in determining the optimum route to a server that contains the requested Internet service, wherein said service control point component and said domain name server component are united in a same structure as an Internet service node.

\* \* \* \* \*